United States Patent
McCollough et al.

(10) Patent No.: US 9,663,243 B2
(45) Date of Patent: *May 30, 2017

(54) POWER SAFETY INSTRUMENT SYSTEM

(71) Applicant: TEXTRON INNOVATIONS INC., Providence, RI (US)

(72) Inventors: James M. McCollough, Arlington, TX (US); Erik Oltheten, Azle, TX (US); Nicholas Lappos, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,356

(22) Filed: May 31, 2016

(65) Prior Publication Data

US 2016/0272342 A1    Sep. 22, 2016

Related U.S. Application Data

(63) Continuation of application No. 14/715,236, filed on May 18, 2015, now Pat. No. 9,352,849, which is a
(Continued)

(51) Int. Cl.
*G08B 21/00* (2006.01)
*B64D 45/00* (2006.01)
(Continued)

(52) U.S. Cl.
CPC .............. *B64D 45/00* (2013.01); *B60Q 1/00* (2013.01); *B64C 27/04* (2013.01); *B64D 43/00* (2013.01);
(Continued)

(58) Field of Classification Search
CPC ........... B64C 27/04; B64D 43/00; G01L 3/24; G01D 7/08; G01D 7/002
(Continued)

(56) References Cited

U.S. PATENT DOCUMENTS 3,616,691 A * 11/1971 Brandau .................. G01L 3/24
                                                            73/178 H
3,754,440 A    8/1973 Edgerton et al.
(Continued)

FOREIGN PATENT DOCUMENTS

EP    0330147 A2    8/1989

OTHER PUBLICATIONS

Supplementary European Search Report dated Jun. 11, 2014 from counterpart EP App. No. 10861026.2.
(Continued)

*Primary Examiner* — Hoi Lau
(74) *Attorney, Agent, or Firm* — James E. Walton

(57) ABSTRACT

A power safety system is configured to provide power information in an aircraft. The power safety system includes a power safety instrument having a power required indicator and a power available indicator, each being located on a display. A position of the power required indicator and the power available indicator represent the power available and power required to perform a hover flight maneuver. The power safety system may be operated in a flight planning mode or in a current flight mode. The power safety system uses at least one sensor to measure variables having an effect on the power required and the power available.

11 Claims, 4 Drawing Sheets

Related U.S. Application Data continuation of application No. 13/641,325, filed as application No. PCT/US2010/061701 on Dec. 22, 2010, now Pat. No. 9,035,802.

(51) Int. Cl.
*B64C 27/04* (2006.01)
*B60Q 1/00* (2006.01)
*B64D 43/00* (2006.01)
B64C 27/00 (2006.01)
B64C 27/52 (2006.01)
B64C 29/00 (2006.01)
B64C 39/02 (2006.01)

(52) U.S. Cl.
CPC .............. *B64C 27/00* (2013.01); *B64C 27/52* (2013.01); *B64C 29/00* (2013.01); *B64C 39/024* (2013.01); *B64C 2201/108* (2013.01); *B64C 2201/121* (2013.01)

(58) Field of Classification Search
USPC ............... 340/946, 971, 969, 945, 973, 963, 340/438–441, 449–452, 956, 959; 701/9, 701/14
See application file for complete search history.

(56) References Cited

U.S. PATENT DOCUMENTS

| | | | | |
|---|---|---|---|---|
| 4,034,605 A * | 7/1977 | Green | ................... | G05D 1/0055 116/DIG. 43 |
| 4,736,331 A * | 4/1988 | Lappos | ................... | B64D 43/00 701/14 |
| 5,150,117 A | 9/1992 | Hamilton et al. | | |
| 5,915,273 A * | 6/1999 | Germanetti | ............ | B64D 43/00 73/178 H |
| 7,212,942 B2 * | 5/2007 | Vollum | ..................... | G01L 3/24 702/127 |
| 7,414,544 B2 * | 8/2008 | Oltheten | ................. | G01D 7/002 340/945 |
| 7,801,695 B2 * | 9/2010 | Moeckly | ................... | F02C 7/00 701/67 |
| 9,035,802 B2 * | 5/2015 | McCollough | ........... | B64C 27/04 340/438 |
| 9,352,849 B2 * | 5/2016 | McCollough | ........... | B64C 27/04 |
| 2004/0254747 A1 | 12/2004 | Vollum | | |
| 2006/0287778 A1 | 12/2006 | Oltheten et al. | | |
| 2008/0136677 A1 * | 6/2008 | Clark | ..................... | B64D 43/00 340/969 |
| 2008/0198040 A1 * | 8/2008 | Cottet | ....................... | G01L 3/24 340/971 |
| 2009/0138142 A1 | 5/2009 | Still et al. | | |
| 2010/0161247 A1 | 6/2010 | Moeckly | | |
| 2013/0120165 A1 * | 5/2013 | McCollough | ........... | B64C 27/04 340/946 |
| 2015/0130644 A1 | 5/2015 | Kiel | | |
| 2015/0321769 A1 * | 11/2015 | McCollough | ........... | B64C 27/04 340/946 |

OTHER PUBLICATIONS

First Office Action dated Feb. 25, 2015 from counterpart CN App. No. 201080070916.4.
Office Action dated Aug. 1, 2014 from counterpart CA App. No. 2,820,001.
International Search Report and the Written Opinion of the International Searching Authority dated Feb. 14, 2011 from counterpart PCT App. No. PCT/US10/061701.
Second Office Action dated Oct. 22, 2015 from counterpart CN App. No. 201080070916.4.
European Search Report dated Jan. 5, 2016 from counterpart EP App. No. 15174684.9.
Third Office Action dated May 16, 2016 from counterpart CN App. No. 201080070916.4.
European Search Report dated Dec. 22, 2016 from counterpart EP Application No. 16180840.7.

* cited by examiner

POWER SAFETY INSTRUMENT SYSTEM

CROSS REFERENCE TO RELATED APPLICATIONS

This application is a continuation of U.S. application Ser. No. 14/715,236, filed 18 May 2015, titled "Power Safety Instrument System," which is a continuation of U.S Pat. No. 9,035,802, filed 30 Jan. 2013, issued 19 May 2015, and titled "Power Safety Instrument System," which is a National Stage Entry of P.C.T. Application No. PCT/US2010/061701 filed 22 Dec. 2010, titled "Power Safety Instrument System," all of which are hereby incorporated by reference for all purposes as if fully set forth herein. Also, U.S. Pat. No. 7,414,544 to Oltheten et al., is hereby incorporated by reference.

TECHNICAL FIELD

The system of the present application relates to a flight instrument for an aircraft. In particular, the system of the present application relates to a power safety instrument for a rotorcraft.

BACKGROUND

The power required to operate a rotorcraft may substantially change during the flight path of the rotorcraft. A rotorcraft typically requires substantially more power during a hover, compared to when the rotorcraft is traveling forward at a moderate airspeed. For example, as the rotorcraft is slowed to a landing, the increased power requirement at hover can consume all the power that the engine(s) have available (particularly with a heavy aircraft at a hot temperature and high altitude environment) causing loss of rotor rpm, an uncontrolled descent, and possibly a crash landing. Furthermore, the exact power required during hover is affected by a variety of variables, such as pressure altitude and air temperature.

Typically, a pilot will make pre-flight calculations to predict if the rotorcraft will have adequate power available to make an approach to hover. The pilot will typically make these pre-flight calculations by collecting information from several sources. The calculations may include an estimate of the power required by the aircraft to fly at hover at a specific location. Another calculation may include an estimate of the power available by the aircraft at hover at the specific location. The power available and power required calculations are then compared to in order to predict sufficient power margin.

Typically, the aforementioned power available and power required calculations are performed by the pilot on the ground in consultation with relevant performance charts in the rotorcraft flight manual. If the expected flight involves performing a hover landing at a landing site that is different than the departure site, then the pilot must make educated guesses regarding certain conditions at the time of landing. For example, the pilot will typically make an educated guess in predicting the approximate weight of the rotorcraft at the time of landing. In addition, the pilot will make an educated guess regarding the predicted air temperature and pressure altitude at the landing site. Each of these variables can be difficult to accurately predict.

There are many potential error opportunities due to the pilot having to read one or more charts, as well as make predictions regarding future flight conditions and atmospheric conditions. Furthermore, pilots typically are very conservative in order to allocate margin for any calculation errors. As a result, many rotorcraft are not fully utilized as pilots protect themselves and passengers from small but consequential errors and in-flight changes in the predicted variables (aircraft weight, outside air temperature, and pressure altitude). For example, a rotorcraft may make two separate flights transporting passengers from a departure site to a destination site when in fact the rotorcraft was fully capable of performing the task in a single flight. Such underutilization of rotorcraft cost rotorcraft operators an enormous amount of time and money over the life of a rotorcraft.

Although the developments in rotorcraft flight instrumentation have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
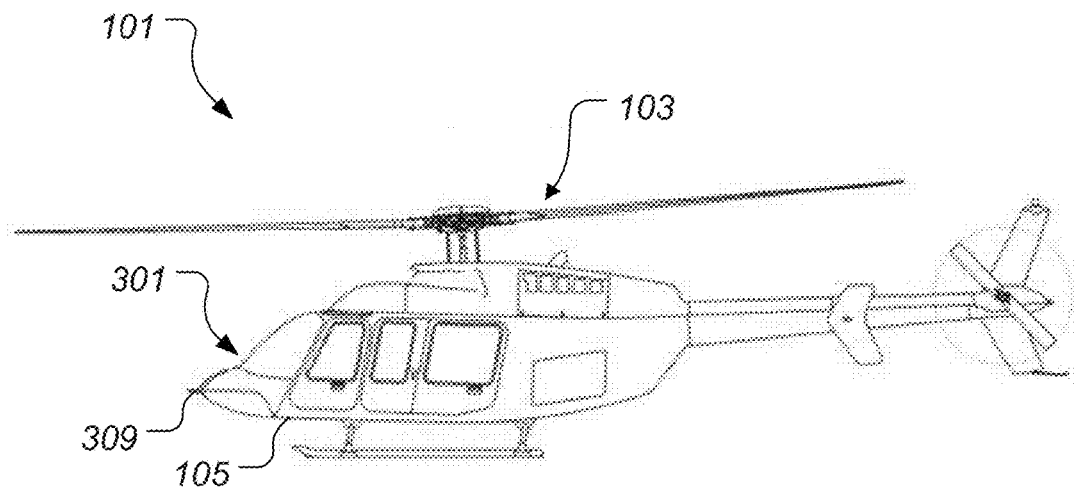
FIG. 1 is a side view of a rotorcraft according the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
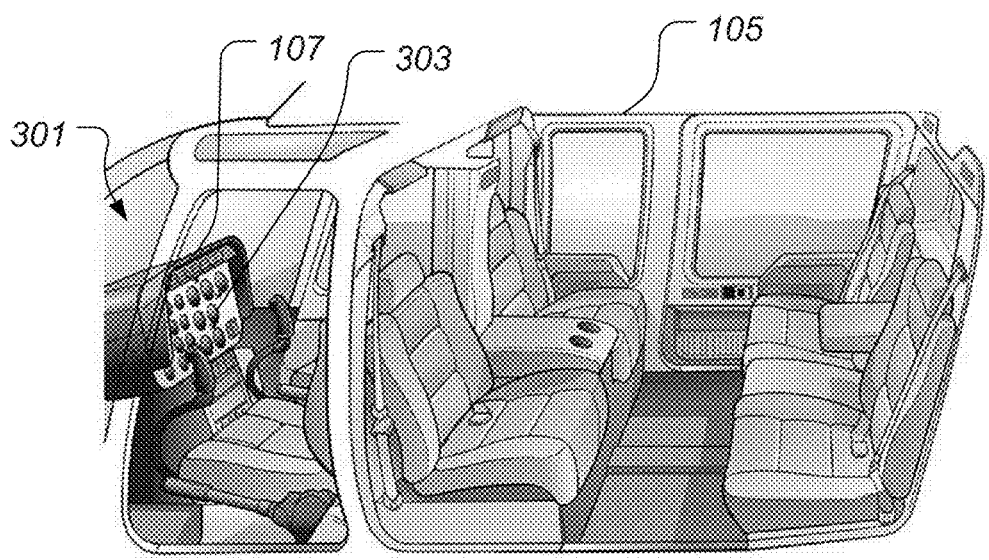
FIG. 2 is a partial perspective view of a cockpit portion of the rotorcraft from FIG. 1.

Referring to FIGS. 1 and 2, a rotorcraft 101 having a power safety system 301 is illustrated. Rotorcraft 101 has a fuselage 105 and rotor system 103. Rotor system 103 includes a plurality of rotor blades driven by a rotor mast and at least one engine. In the preferred embodiment, the engine(s) is a turbine engine; however, other engines may be used. Rotor system 103 is configured to provide propulsive forces for flying in at least a hover mode and a forward flight mode. Rotorcraft 101 includes a plurality sensors 309 configured to conduct and record a variety of measurements, such as a fuel gauge, cargo hook load cell, air temperature gauge, altimeter, engine torque gauge, gas producer speed gauge, gas temperature gauge, engine bleed air indicator, main rotor mast torque sensor, fuel flow gauge, and generator load gauge, to name a few. Rotorcraft 101 also includes a cockpit 107 for housing a power safety instrument 303 of power safety system 301. It should be appreciated that cockpit 107 may any of a variety of cockpit designs, including a "glass cockpit" design in which one or more instruments (such as power safety instrument 303) are digitized and graphically displayed on a screen. It should be appreciated that even though rotorcraft 101 is depicted as a helicopter; the scope of the present application is not so limited. For example, rotorcraft 101 may be any aircraft capable of performing a vertical take-off, a vertical landing, or hover. As such, rotorcraft 101 may be a helicopter, a tiltrotor, a tilt-wing aircraft, a hybrid aircraft, or a vertically landing jet aircraft, to name a few. Rotorcraft 101 may also be an unmanned aircraft. An embodiment of power safety system 301 designed for an unmanned aircraft is preferably configured to provide the power safety instrument 303 information to a remote operator of the aircraft through telemetry, or the like. If the unmanned aircraft does not require a remote operator, then the power safety instrument 303 information may be processed directly by the aircraft system responsible for flying the unmanned aircraft.

Figure 3:
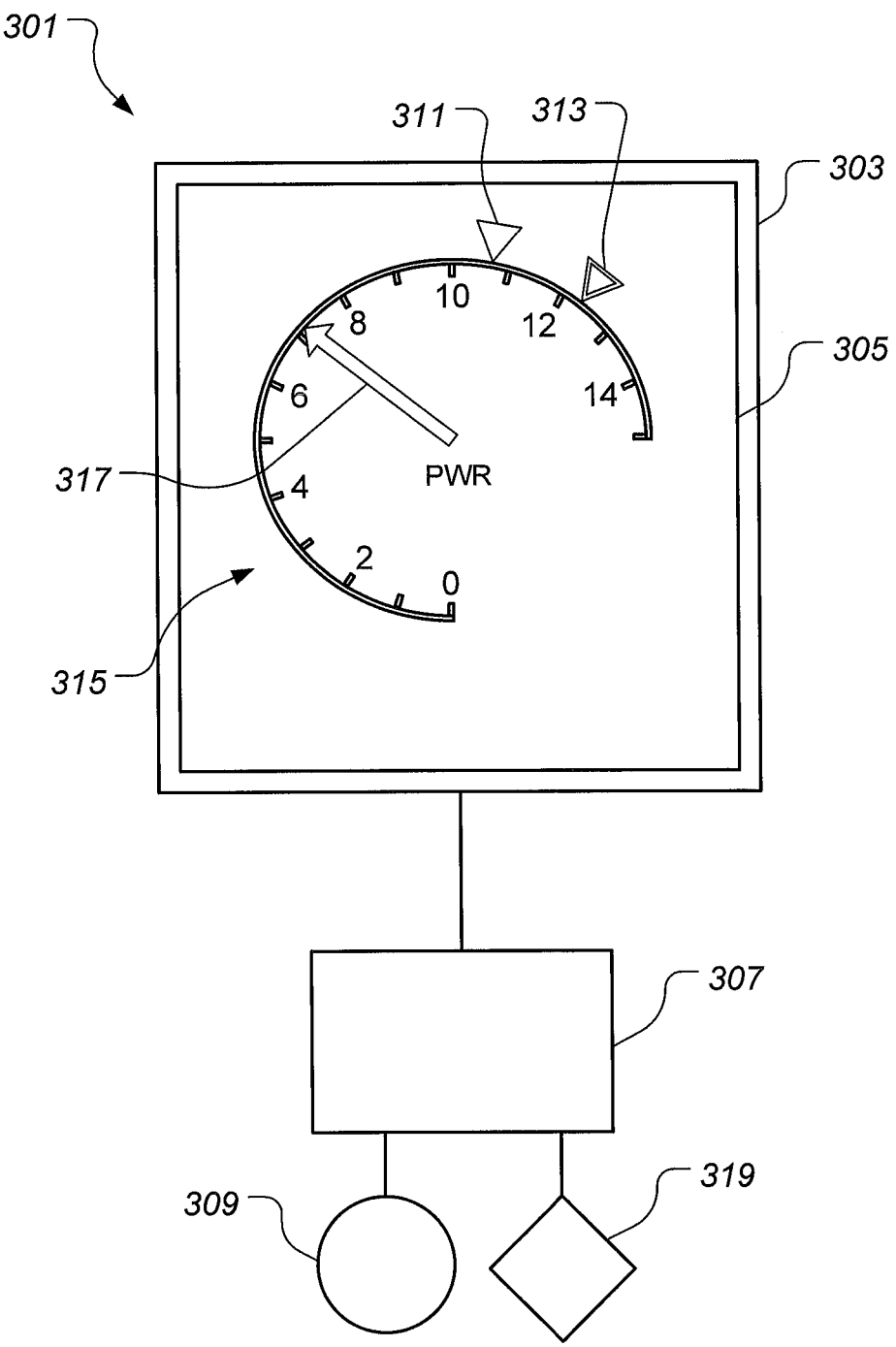
FIG. 3 is a schematic view of a power safety system according to the preferred embodiment of the present application.

Referring to FIG. 3, an embodiment of a power safety system 301 is illustrated. Power safety system 301 preferably includes a power safety instrument 303, a calculation unit 307, at least one sensor 309, and at least one data input device 319. Power safety instrument 303 is configured for installation in cockpit 107 of rotorcraft 101. Power safety instrument 303 includes a power gauge 315 visibly portrayed on a display 305. Power gauge 315 preferably includes a power required (PR) indicator 311, a power available (PA) indicator 313, and a power usage needle 317. Power gauge 315 includes numbers 1 through 14, along with respective hatch marks, which are non-dimensional and are provided for reference only.

Power safety system 301 includes a plurality of sensors, such as sensors 309 on rotorcraft 101, which are schematically represented as sensors 309 in FIG. 3. Sensors 309 are configured to sense various parameters. A data input device 319 is configured for manual entry of data, Data input device 319 may be a variety of hardware devices, such as a keyboard, a numeric keypad, twist knob, or a touch screen portion on display 305, to name a few examples. A calculation unit 307 is configured to process data provided by sensors 309 and data input device 319, as discussed further herein. Calculation unit 307 may be any processor capable of storing and processing a data for communicating to the pilot via power safety instrument 303.

Power safety instrument 303 conveniently displays power required (PR) via PR indicator 311, power available (PA) via PA indicator 313, and power usage via power usage needle 317, all instantaneously calculated and updated. Thus, the pilot of the rotorcraft is oriented as to how much power margin will be available as he brings the rotorcraft into a hover landing. For purposes of this disclosure, power margin is the difference between PA and PR to operate at a hover, as visually depicted by PA indicator 313 and PR indicator 311, respectively.

It should be appreciated that power safety instrument 303 may take on a wide variety of configurations. Outputs from power safety instrument 303 may be communicated to the pilot in a variety of methods, including visually, audible, and/or through a sensory touch system such as a vibration cue, to name a few. Furthermore, even though PR indicator 311 and PA indicator 313 are depicted as triangular shapes, each indicator 311 and 313 may be configured in a wide variety of shapes and colors. Similarly, power safety instrument 303 may take on a wide variety of configurations. Features of power safety instrument 303 may be integrated into other instruments within cockpit 107.

Figure 4:
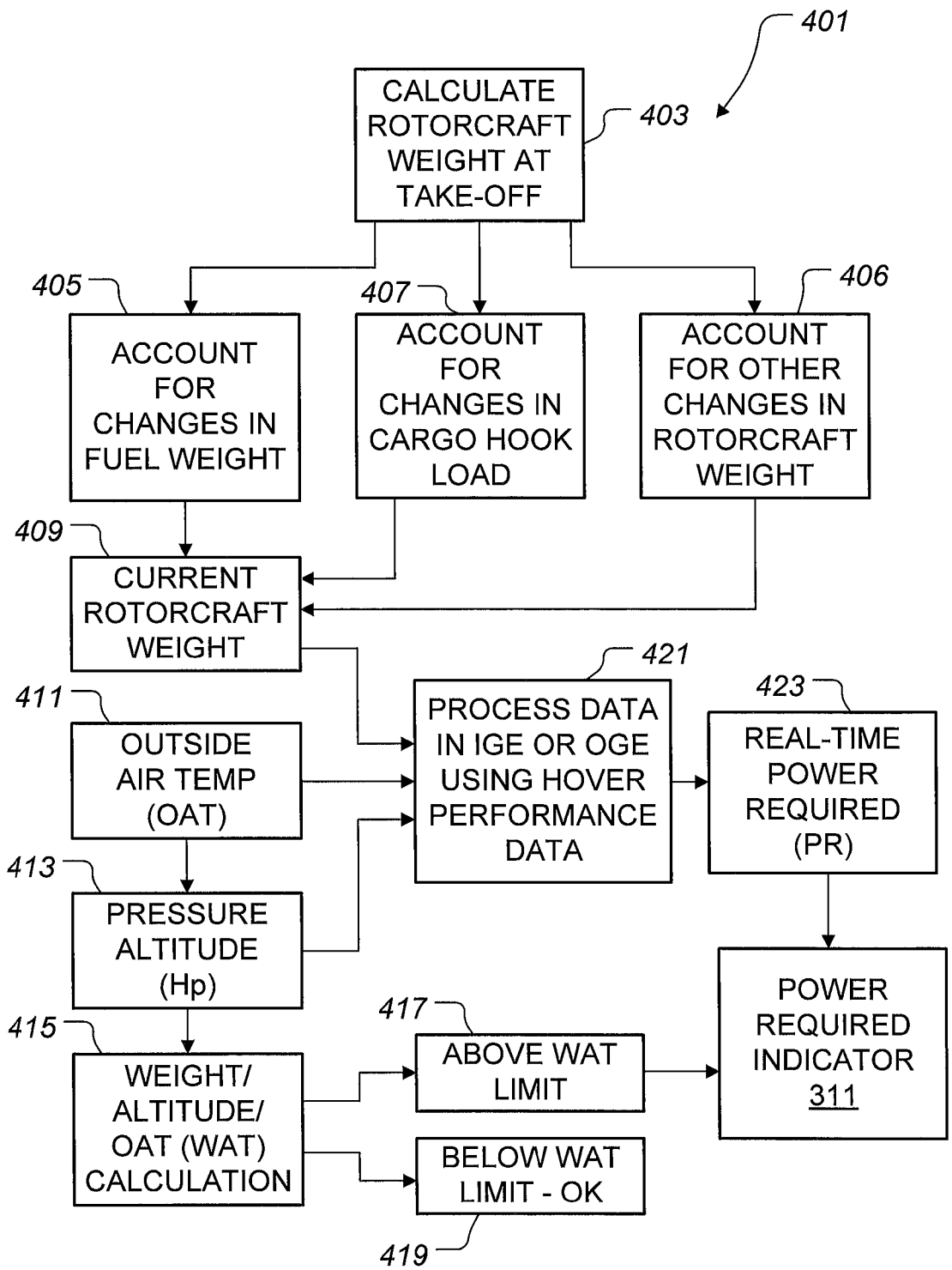
FIG. 4 is a schematic view of a calculation of power required calculation, according to the preferred embodiment of the present application.

Referring now also to FIG. 4, calculation unit 307 calculates instantaneous power required (PR) in a PR calculation 401. PR is visually depicted to the pilot with PR indicator 311 on power gauge 315. PR calculation 401 includes a step 403 for calculating the take-off weight of rotorcraft 101. In one embodiment, the pilot simply calculates the take-off weight of rotorcraft 101 by adding the fuel weight, passenger/cargo weight, and any other weight contributing articles. The pilot then inputs the rotorcraft take-off weight via data input device 319. In another embodiment, a landing gear sensor automatically calculates the take-off weight and sends the data to calculation unit 307. As an added safety measure, PR calculation 401 is configured so that if the pilot does not enter a rotorcraft weight at take-off, then the rotorcraft's maximum gross weight is used as the default. Power safety system 301 is configured to communicate a message on display 305 reminding the pilot to enter and/or verify rotorcraft weight prior to take-off. For example, if a pilot briefly lands rotorcraft 101 to take-on two additional passengers without shutting down, then a weight-on-gear-sensor informs power safety system 301 that the rotorcraft has landed, thereby instigating a message on display 305 for the pilot to enter the new rotorcraft weight prior to take-off.

A step 405 includes accounting for any change of in the weight of fuel in rotorcraft 101. For example, as the rotorcraft burns fuel during operation, step 405 includes accounting for changing the current rotorcraft weight in accordance with the amount of fuel consumed. The weight of the burned fuel may be calculated by various means, such as a fuel flow measuring device, or by simply accounting for changes in the fuel tank gauge. A step 407 includes accounting for changes in a cargo hook load. Some rotorcraft may include a cargo hook for supporting external loads. As such, a load cell device may be used to measure changes in the cargo hook load. Other sensors and devices may be used to account for changes to the rotorcraft weight during operation. For example, if the rotorcraft is a military aircraft with munitions (bullets, missiles, rockets, and the like), the deployment of a munition causes the rotorcraft weight to change. A step 406 includes accounting for any other changes to the weight of the rotorcraft. Furthermore, step 406 includes the pilot manually inputting any known change to the weight of the rotorcraft. For example, if the pilot knows he has just lost 500 pounds during flight (paratroopers, cargo drop, etc.), then step 406 includes the pilot accounting for the weight change with an entry with data input device 319. Step 406 also includes automatically accounting for any changes to the rotorcraft weight when such a weight changing activity is measured or accounted for by any sensor 309.

A step 409 represents the real time weight of the rotorcraft during operation, after accounting for weight changes during operation of rotorcraft 101. As the weight of the rotorcraft decreases, the power required to operate the rotorcraft at hover also decreases. If the weight of the rotorcraft increases during operation (via cargo hook for example), then the power required to operate the rotorcraft at hover also increases.

A step 411 includes continuously measuring outside air temperature (OAT) with an OAT probe, or other temperature measuring device. OAT affects the power required to operate the rotorcraft at a hover. For example, generally air at a higher OAT is less dense than air at a lower OAT, for a given altitude. As such, the PR to operate the rotorcraft at hover is a function of OAT. For example, OAT may influence PR due to main rotor blade tip Mach effects. The effect of OAT on PR is preferably determined using a look-up table in calculation unit 307. In such an embodiment, rotorcraft specific performance data correlating OAT to PR is stored in a look-up table data format within calculation unit 307, or other data storage device operably associated with calculation unit 307. In an alternative embodiment, OAT measured data may be used to calculate PR using rotorcraft performance equations.

A step 413 includes continuously calculating the pressure altitude (Hp), which is the air pressure at a particular altitude. Hp affects the power required to operate the rotorcraft at a hover in part because air at a higher pressure is more compressed and denser, than air at a lower pressure. As such, the PR to operate the rotorcraft at hover is a function of Hp. The effect of Hp on PR is preferably determined using a look-up table in calculation unit 307. In such an embodiment, rotorcraft specific performance data correlating Hp to PR is stored in a look-up table data format within calculation unit 307, or other data storage device operably associated with calculation unit 307. In an alternative embodiment, Hp measured data may be used to calculate PR using rotorcraft performance equations.

It should be appreciated that other data may be measured and used in the calculation of PR. For example, air humidity and wind speed may also be used in the calculation of PR. In certain situations, wind speed may be measured at a hover site. The measured wind speed data can be communicated to the pilot for manual entry via data input device 319. For example, instrumentation at a landing site may measure wind speed and communicate that to the pilot via VHF radio communication. Regardless as to how the pilot is informed of wind speed at the landing site, the pilot may enter the wind speed data via data input device 319. Additionally, a real-time outside air velocity, measured relative to the rotorcraft, may be determined by a low air velocity sensor on the rotorcraft, the outside air velocity data being automatically sent to calculation unit 307. It should be appreciated that alternatively the pilot may input the outside air velocity data into calculation unit 307. The effect of outside air velocity on PR is calculated in calculation unit 307. System 301 may be configured such that outside air velocity data is used in the calculation of PR only if the outside air velocity exceeds a minimum threshold. For example, a minimum threshold of a 10 knot outside air velocity may be used.

A step 421 includes processing the data recorded in steps 409, 411, and 413 using rotorcraft hover performance data to derive real-time PR in a step 423. Hover performance data is stored in calculation unit 307. PR may be derived for at least an in-ground effect (IGE) hover or out-of-ground effect (OGE) hover. OGE can be characterized as performing a hover of the rotorcraft above a distance of approximately one rotor diameter from the ground, or other hard surface. For example, if the rotor diameter is 37 feet, then a hover within 37 feet of the ground would be considered an OGE hover. IGE hover includes a rotorcraft hover performed at a certain distance to the ground. The IGE distance is typically defined by a rotorcraft manufacturer as a hover where the landing gear is a within a certain distance to the ground. IGE hover requires less power than OGE due to ground effect influences associated with the downwash of the rotor blades causing a high pressure area between the rotor blades and the ground. In the preferred embodiment, power safety instrument 303 includes a toggle or other input device so that the pilot may dictate that the PR be calculated based upon ICE or OGE. Alternatively, IGE or OGE may be automatically determined by one or more sensors 309 on the rotorcraft 101. It should be appreciated that certain landing site conditions may negate ground effect influences upon hover, such as hovering above long grass or water. As such, system 301 is configured so that the pilot can dictate PR to be calculated based upon IGE or OGE.

Furthermore, power safety instrument 303 may be configured to graphically communicate to the pilot that PR indicator 311 is being calculated based on IGE hover or OGE hover. For example, PR indicator 311 may have a "I" character associated with PR indicator 311 to communicate to the pilot that PR is currently being calculated based upon a IGE hover. Similarly, PR indicator 311 may have an "O" character associated with PR indicator 311 to communicate to the pilot that PR is currently being calculated based upon an OGE hover. As an added safety measure, power safety system 301 may be configured to default to OGE since it requires more power to perform an OGE hover than an IGE hover. As such, if the rotorcraft has enough power to perform an OGE hover, then it has enough power to perform an IGE hover. An example of an IGE hover is taking off or landing at a helipad. An example of an OGE hover is a logging rotorcraft hovering above a tree line waiting for ground personnel to connect a sling load of lumber, the hovering distance being such that PR is calculated using OGE.

Rotorcraft hover performance data is typically supplied by the rotorcraft manufacturer in a graphic chart format. Power safety system 301 preferably includes the mathematical relationships of the rotorcraft hover performance data in electronic format so that a computer processor in calculation unit 307 may calculate PR based upon the real time data collection in steps 409, 411, and 413. Step 423 represents the real time calculation of PR. The real time calculation of PR is graphical displayed on power safety instrument 303 via PR indicator 311.

A step 415 includes a weight-altitude-temperature (WAT) calculation. The WAT calculation is compared to a WAT limit associated with the rotorcraft. The WAT limit of the rotorcraft represents an aircraft limitation at a certain combination of aircraft weight, altitude, and OAT. Step 415 includes calculating the WAT calculation by analyzing the real time data acquired in steps 409, 411, and 413. If the WAT calculation is below the rotorcraft WAT limit, then the WAT calculation does not produce a limitation, as depicted in step 419. However, if the WAT calculation is equal to or above the rotorcraft WAT limit, then the WAT calculation does produce a limitation, as depicted in step 417. As such, when the WAT calculation exceeds the rotorcraft WAT limit, then power safety system 301 is configured to communicate that to the pilot. In one embodiment, PR indicator 311 changes size, shape, or color so that the pilot knows that if he or she attempts to perform a hover at the current weight/altitude/OAT, then the WAT limit will be exceeded, possibly causing loss of aircraft control during the attempt to perform the hover. The aforementioned transformation of PR indicator 311 prevents the pilot from incorrectly thinking it is safe to perform a hover, take-off, or landing, even though power safety instrument 303 may depict sufficient margin between PA indicator 313 and PR indicator 311.

Figure 5:
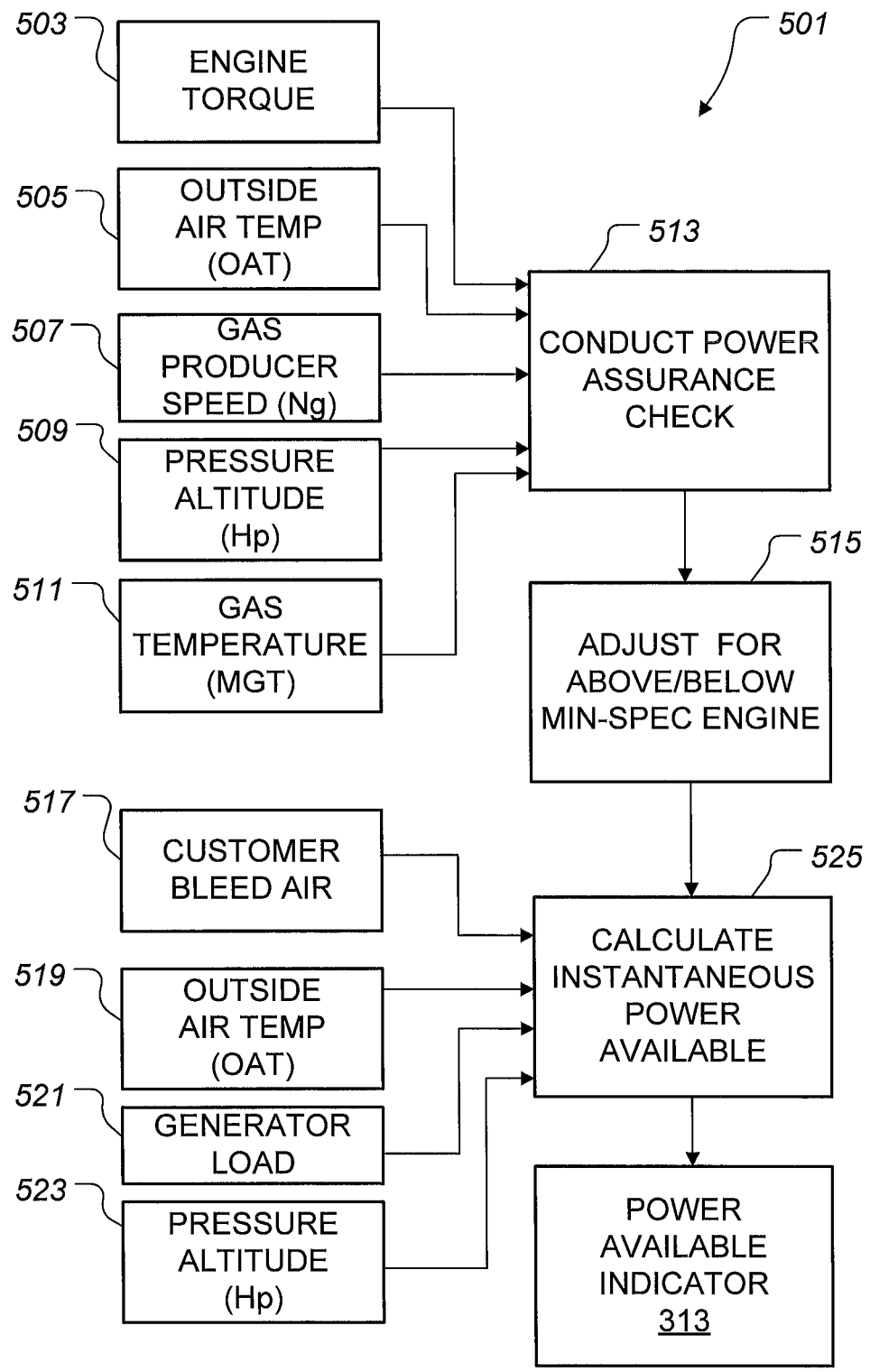
FIG. 5 is a schematic view of a calculation of power available calculation, according to the preferred embodiment of the present application.

Referring now to FIG. 5, calculation unit 307 calculates instantaneous power available (PA) in a PA calculation 501. PA is visually depicted to the pilot with PA indicator 313 on power gauge 315. PA calculation 501 includes a step 513 for conducting a power assurance check of the engine(s) of rotorcraft 101. Conducting a power assurance check in step 513 includes acquiring data from one or more sensors 309 in order to evaluate the health and performance of the engine. A power assurance check may be conducted to verify the engine is able to meet minimum requirements. Furthermore, the power assurance check may be conducted to quantity performance of the engine. Typically, rotorcraft engine(s) are initially delivered above "min-spec", meaning the performance of the engine provides more power available than is stated in the rotorcraft specification and power available charts. For example, if an engine is 6% above min-spec, then the engine has approximately 6% more power available than a min-spec engine, at the same ambient conditions. However, unless the pilot is able to account for the 6% above min-spec power, the pilot isn't able to confidently take advantage of the above min-spec power available during flight operations. It should also be appreciated that engine performance may degrade over time, thus it is important for the pilot to be able to account for engine degradation in order to continue safe operation of the rotorcraft.

A variety of measurements may be taken in order to conduct the power assurance check in step 513. For example, a step 503 includes measuring the torque produced by the engine in the rotorcraft. A step 505 includes measuring the OAT which affects the power produced by the engine. A step 507 includes measuring the gas producer speed (Ng) of the engine. A step 509 includes measuring the pressure altitude (Hp), which affects the power produced by the engine. A step 511 includes measuring the gas temperature (MGT), which affects the power produced by the engine. It should be appreciated that any combination of measurements may be taken in order to conduct the power assurance check in step 513, including measurements other than depicted in steps 503, 505, 507, 509, and 511.

The power assurance check of step 513 is performed periodically, such as in a hover or forward flight procedure. The power assurance check of step 513 may also be performed during a pre-flight procedure. Additionally, the power assurance check of step 513 may be conducted by the pilot, or it may occur autonomously without requiring pilot interaction. Preferably, calculation unit 307 records a rolling average of the most recent power assurance checks. For example, the result of the ten most recent power assurance checks may be averaged to derive a power assurance calculation. In another embodiment, the power assurance check of step 513 may simply provide a pass/fail result, a passing result meaning that the engine meets the requirements of a min-spec engine.

A step 515 includes interpreting the power assurance data from step 513 in order to determine the performance of the engine in terms of a percentage above or below min-spec. In one embodiment, power assurance data from step 513 is compared with min-spec engine power, thus arriving at percentage above or below min-spec power. In another embodiment, the power assurance check from step 513 only provides a pass/fail determination, such that step 515 includes determining a percentage above or below min-spec engine based upon an input from the pilot. For example, if the pilot knows the rotorcraft has a +10% engine (10% above min-spec), then the pilot enters that into power safety system 301 via data input device 319. Alternatively, step 515 may be autonomously performed by calculation unit 307, or manually entered by the pilot.

Preferably, step 515 also includes accounting for any rotorcraft propulsion configuration which may affect engine performance. For example, an air inlet configuration on the rotorcraft may increase or decrease power available. Furthermore, an air inlet configuration may include a standard inlet, a particle separator inlet, inlet barrier filter, and snow baffles, to name a few. As such, a particular inlet configuration may correlate to particular performance data to be used in the calculation of PA in step 525. Therefore, step 515 includes the ability for the pilot to enter information, with data input device 319, regarding a configuration (such as air inlet configuration) that in turn may dictate particular performance data used in the calculation of PA by calculation unit 307.

A step 525 includes calculating instantaneous PA based upon the above/below min-spec engine determination from step 515, as well as a plurality of instantaneous measurements from sensors 309. A step 517 includes measuring engine bleed air being drawn from the engine. The measurement of engine bleed air usage may include simply determining if the engine bleed air switch is on or off. Alternatively, the measurement of engine bleed air may include taking one or more measurements to quantify an amount of bleed air being drawn from the engine. Engine bleed air acts as a drain on engine PA, as such, if engine bleed air is turned off, then PA increases. A step 519 includes measuring OAT, which has an effect on PA. A step 521 includes measuring the generator load on the engine, which affects PA. For example, if the pilot turns off a system that requires electrical power, then the generator load on the engine decreases, thereby causing the PA to increase. A step 523 includes measuring the Hp, which similar to OAT, has an effect on PA. It should be appreciated that any combination of measurements may be taken in order to conduct the PA calculation in step 525, including measurements other than depicted in steps 517, 519, 521, and 523. The instantaneous calculation of PA in step 525 is graphical displayed on power safety instrument 303 via PA indicator 313.

In the preferred embodiment, the PA calculated in step 525 is limited by any rotorcraft limitation. For example, in certain cases PA is limited by a transmission torque limit. In such a situation, PA indicator 313 preferably does not exceed the transmission torque limit. Therefore, the pilot can trust that the position of PA indicator 313 is the absolute PA. In one embodiment, PA indicator 313 includes a graphic to communicate to the pilot that the PA indicator 313 position is being limited by the transmission torque limit, or other rotorcraft limitation. For example, if the PA indicator 313 is being limited by the transmission torque limit, then "T" is displayed in the PA indicator 313. In alternative embodiment, PA indicator 313 is not restricted by the transmission torque limit, or other rotorcraft limitation.

In the case of a multi-engine rotorcraft, step 525 may also be configured to process data in order to calculate PA for an emergency landing maneuver upon the loss of an engine. For example, if a multi-engine rotorcraft loses an engine, then PA indicator 313 may be configured to represent the PA for the rotorcraft to perform an emergency landing maneuver in a one-engine-inoperable (OEI) condition. As such, the pilot is able to look at power safety instrument 303 and determine if there is sufficient margin between the PR indicator 311 and PA indicator 313 in order to perform an emergency landing maneuver at the current atmosphere conditions and rotorcraft configuration with OEI. Further regarding an OEI condition, if rotorcraft 101 were to lose an engine, then the remaining engine(s) may be required to operate at an unsustainable level. As such, power gauge 315 may be configured so that PA indicator 313 visually forecast the PA at certain engine levels. For example, if an engine is only able to operate 30 seconds at an extremely high level, then the PA indicator 313 may visually communicate that the PA indicator position will decrease after the 30 second time period expires. The operable engine may then be able to run at a decreased level for two minutes after the expiration of the 30 second time limit. Therefore, the PA indicator 313 would move accordingly, then visually communicate that the current PA indicator position is valid for the next two minutes. This process may continue if the engine is operating at a PA that is sustainable. Such a feature of system 301 allows the pilot to quickly ascertain margin between PR and PA during an OEI condition for an multi-engine rotorcraft.

Referring again to FIG. 3, power safety system 301 provides for efficient and safe operation of rotorcraft 101. During operation of rotorcraft 101, power safety system 301 orients the pilot in real-time so that the pilot can quickly and accurately ascertain whether a hover landing or take-off is achievable. Moreover, power safety system 301 continuously displays PR and PA at the current rotorcraft location so that the pilot, by observing the positions of PR indicator 311 and PA indicator 313, may ascertain whether it is safe to perform a hover at any time during the flight. Power safety system 301 also provides the ability of the pilot to make changes to the weight of the aircraft in order to produce sufficient margin between PR and PA to achieve the hover. A non-limiting example is the pilot burning fuel for an extra 30 minutes for the sole reason of reducing aircraft weight. Because PR and PA are calculated in real-time, the pilot is able to burn just enough surplus fuel as required to result in sufficient margin between PR and PA for the desired hover.

The following non-limiting simplified flight scenario is provided to illustrate power safety system 301 in operation. A rotorcraft pilot is tasked with performing a search-and-rescue (SAR) mission for a mountain climber. The pilot only has a general idea of the area where the mountain climber may be located. Because the pilot does not know the future hover location, the pilot is unable to make an accurate pre-flight calculation regarding whether the rotorcraft is able to perform a hover at the unknown location. However, the rotorcraft is equipped with power safety system 301. After, the pilot locates the mountain climber and a landing area, the pilot simply flies over the hover site while maintaining a sufficient forward speed. Power safety system 301 records and processes data necessary to calculate PA and PR to perform a hover at the site. The pilot may also enter the mountain climber's weight into power safety system 301 via data input device 319. The pilot looks at power safety instrument 303 and ascertains that there is sufficient margin between PR indicator 311 and PA indicator 313 to perform the hover. The pilot then slows the rotorcraft to a hover and safely performs the hover at the hover site.

Power safety system 301 is preferably configured to operate in a flight planning mode, in addition to real-time flight mode. Flight planning mode allows the pilot to predict PA and PR at a future hover location. Power safety system 301 may be operated in flight planning mode either pre-flight or during a flight. When power safety system 301 is being operated in a flight planning mode during a flight, power safety instrument 303 preferably communicates to the pilot that power safety system 301 is being operated in a flight planning mode so that the pilot does not mistake the positions of PR indicator 311 and PA indicator 313 as being real-time flight positions. Flight planning mode operation of power safety system 301 involves the pilot manually entering a predicted rotorcraft weight, pressure altitude (Hp), and outside air temperature (OAT), at the desired hover location. It should be appreciated that OAT and Hp may be substituted with a density altitude measurement. Furthermore, the pilot may be made aware of hover site conditions through wireless communication, such as VHF radio, from instrumentation at a landing site. Hp and OAT at the desired hover site may be automatically communicated to power safety system 301 via wireless data transfer, such as telemetry or the like. For example, if the desired hover site is an improved landing site with weather instrumentation connected to transmitter, then power safety system 301 may automatically acquire the Hp and OAT data such that the pilot only has to enter a predicted aircraft weight. Operation of power safety system 301 in flight planning mode prevents pilot errors associated with trying to read small paper charts. Furthermore, operation of power safety system 301 in flight planning mode allows the rotorcraft to be more fully utilized by performing the calculations of PA and PR to a high level of accuracy.

The flight planning mode is also configured for determining a maximum allowable weight of the rotorcraft while having sufficient margin between PA and PR at hover. In such a situation, the pilot enters a desirable amount of margin between PA and PR, and enters the necessary data. System 301 calculates a maximum weight of the rotorcraft and displays that amount to the pilot on display 305.

It should be appreciated that margin between the PA and PR may be communicated to the pilot in terms of weight margin. For example, display 305 may include a graphic of margin between PA and PR quantified in terms of weight margin, the weight margin being the extra amount of weight the rotorcraft could be carrying while still having sufficient PA to meet the PR to hover. Certain pilots may desire to comprehend margin between PA and PR in terms of weight, instead of visually observing a distance between PR indicator 311 and PA indicator 313.

The system of the present application provides significant advantages, including: (1) providing a pilot real-time data during rotorcraft operation for deciding whether it is safe to perform a hover; (2) allowing a pilot to maximize rotorcraft payload; (3) allowing a pilot to operate a rotorcraft without having to perform pre-flight hover calculations; (4) allowing a pilot to determine a hover site while operating the rotorcraft; (5) providing a flight planning tool that accurately calculates predicted power available and power required for a predicted hover; (6) providing a tool that safely determines an amount of weight a rotorcraft can carry while still having sufficient margin between PR and PA at the hover site, (7) reducing potential for pilot error; and (8) improving efficiency and safety of the rotorcraft.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

What is claimed is:

1. A method of providing power information in a rotorcraft, the rotorcraft having a powerplant, the method comprising:
    calculating, by a calculation unit, a real-time power required, comprising:
        recording a data associated with a variable, the variable including at least one of: a real-time weight of the rotorcraft, a real-time outside air temperature, a real-time pressure altitude;
        under default conditions, processing the data using hover performance information based upon out-of-ground effect (OGE) performance data; and
        allowing a user to instruct the calculation unit to process the data using hover performance information based upon in-ground effect (IGE) performance data;
    calculating a real-time power available, comprising:
        conducting a power assurance check resulting in a power assurance data;
        determining an amount the powerplant is above or below min-spec criteria;
        recording information associated with a measurement of a variable that affects power available; and
        processing the information using powerplant performance information;
    orienting a power required indicator on a power safety instrument, the position of the power required indicator being dependent upon the calculating of power required; and
    orienting a power available indicator on a power safety instrument, the position of the power available indicator being dependent upon the calculating of power available.

2. The method according to claim 1, further comprising:
    orienting a power usage needle on the power safety instrument, a position of the power usage needle being indicative of the current power being consumed by the rotorcraft.

3. The method according to claim 1, wherein the orienting a power required indicator is restricted based upon the power required being above a WAT limit.

4. The method according to claim 1, wherein the measurement regards at least one of: a current engine bleed air usage, a current outside air temperature, a generator load amount, and a current pressure altitude.

5. A power safety system configured to provide power information in an aircraft, the aircraft including an engine, the power safety system comprising:
    a power safety instrument, comprising:
        a power required indicator located on a display, the power required indicator being configured to communicate a power required to operate the aircraft in a hover flight mode;
        a power available indicator located on the display, the power available indicator being configured to communicate a power available of the powerplant in the aircraft during the hover flight mode;
    at least one sensor configured to measure at least one variable having an effect on the power required and the power available;
    at least one data input device; and
    a calculation unit for calculating the power required to operate the aircraft in a hover flight mode, the calculation unit being configured to default to calculating the power required based upon out-of-ground effect (OGE) performance data;
    wherein the data input device is configured for allowing a user to instruct the calculation unit to use in-ground effect (IGE) performance data for calculating the power required to operate the aircraft in the hover flight mode.

6. The power safety system according to claim 5, wherein the power required is calculated based upon a measurement of a plurality of variables at a moment in time, the power required indicator configured to graphically display the amount of power required to perform the hover flight mode at approximately the same moment in time.

7. The power safety system according to claim 5, wherein the power available is calculated based upon a measurement of a plurality of variables at a moment in time, the power available indicator configured to graphically display the amount of power available to perform the hover flight mode at approximately the same moment in time.

8. The power safety system according to claim 5, wherein the power safety instrument is configured to operate in a flight planning mode such that a position of the power required indicator represents a predicted power required to perform the aircraft in a predicted hover maneuver, and a position of the power available indicator represents a predicted power available from the powerplant in the aircraft during the predicted hover maneuver.

9. The power safety system according to claim 5, wherein a margin between a first position of the power required indicator and a second position of the power available indicator represents surplus power available to perform the hover flight mode.

10. The power safety system according to claim 5, wherein a position of the power required indicator is restricted by a WAT limit.

11. The power safety system according to claim 5, wherein a position of the power available indicator is restricted by a transmission torque limit.

* * * * *